United States Patent [19]

Horgan

[11] 4,274,261
[45] Jun. 23, 1981

[54] CLOSED CYCLE CONTRAROTATING GAS TURBINE POWER PLANT UTILIZING HELIUM AS THE WORKING MEDIUM

[75] Inventor: John J. Horgan, Wethersfield, Conn.

[73] Assignee: United Technologies Corporation, Hartford, Conn.

[21] Appl. No.: 945,655

[22] Filed: Sep. 25, 1978

[51] Int. Cl.³ .............................................. F02C 1/04
[52] U.S. Cl. .................................... 60/682; 415/65
[58] Field of Search ............... 60/682, 516, 519, 525, 60/330, 361, 419, 508, 39.18 R; 415/60, 64, 65, 68, 69; 417/405, 409

[56] References Cited

U.S. PATENT DOCUMENTS

| 2,451,944 | 10/1948 | Hall | 415/65 |
| 3,363,831 | 1/1968 | Garnier | 415/65 |
| 3,379,366 | 4/1968 | Garnier | 415/65 |
| 3,524,318 | 8/1970 | Bauger et al. | 415/68 |
| 3,791,137 | 2/1974 | Jubb et al. | 60/39.18 R |

*Primary Examiner*—Stephen A. Kreitman
*Attorney, Agent, or Firm*—Norman Friedland

[57] ABSTRACT

A power unit consisting of contrarotating axial flow compressor and turbine rotors in a closed cycle helium turbine engine with a centrally located scroll between the compressor and turbine sections (to duct the working medium into and out of the heat source) forms a compact, rugged engine providing lower weight and smaller envelope size for a given power.

4 Claims, 1 Drawing Figure

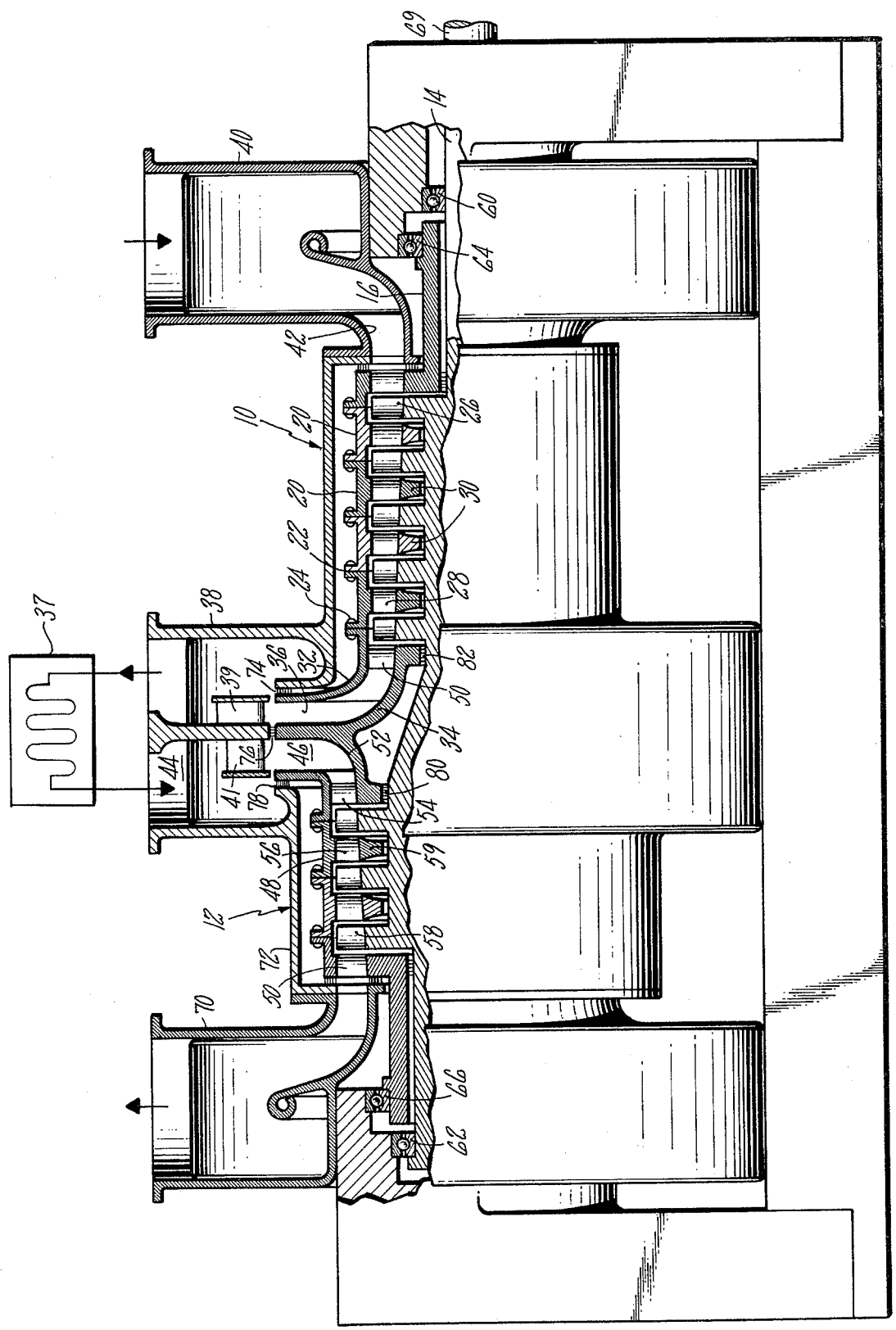

CLOSED CYCLE CONTRAROTATING GAS TURBINE POWER PLANT UTILIZING HELIUM AS THE WORKING MEDIUM

BACKGROUND OF THE INVENTION

This invention relates to gas turbine power plants and particularly to a closed cycle using helium as the working medium and contrarotating rotors of both the compressor and turbine, and particularly where the heat source is a nuclear power plant.

U.S. Pat. No. 3,363,831 granted to M. R. Garnier on Jan. 6, 1968 discloses a contrarotation axial flow gas turbine power plant and U.S. Pat. No. 3,791,137 granted to A. Jubb and D. E. Williams discloses a closed-cycle gas turbine power plant using helium as a working medium.

I have found that I can obtain a smaller, lighter weight and less expensive power unit by combining the features of a contrarotating rotor of both the compressor and turbine sections and utilizing helium as the working medium. Additionally, in accordance with this invention the thrust loads are reduced resulting in a lighter rotor and the critical speed improved because of the rotor being shorter. The compressor stages are of the axial flow type although the last stage may be a centrifugal type, and the turbine rotor likewise is axial flow although the first stage may be of the radial inflow type. A split scroll is centrally located between the compressor and turbine section and serves to direct compressed helium to the heat source and the high energy heated helium from the heat source to the turbine. The machine is made efficacious because it is possible to accommodate wide chord blades that have sufficient capacity to transmit the necessary torque to the outer of the concentrically mounted rotors.

SUMMARY OF THE INVENTION

A feature of this invention is to provide a gas turbine engine with axial flow contrarotating compressor rotors and turbine rotors in a closed cycle with helium being utilized as the working medium. A feature of this invention is to have wide chord blades for transmitting the torque to the outer rotor of concentrically mounted rotors. Using helium in this configuration is advantageous because the speed of sound is low in helium and physical speeds can be raised while avoiding the losses associated with operating near the speed of sound. Velocities of the outer and inner rotors can be in the range of 600 feet per second (fps) and 1100 fps, respectively, the outer rotor will generally rotate at a lower speed than the inner rotor. The engine is characterized as being relatively smaller in length and diameter at reduced cost for a given power, the thrust bearing load is reduced and critical speed is more easily increased to obtain a sufficient margin over the operating speed.

Other features and advantages will be apparent from the specification and claims and from the accompanying drawings which illustrate an embodiment of the invention.

BRIEF DESCRIPTION OF THE DRAWING

The sole FIGURE is a side elevation partially in section schematically illustrating the general arrangement of the components of this invention.

DESCRIPTION OF THE PREFERRED EMBODIMENT

As can be seen by referring to the sole FIGURE, the power plant comprises compressor section 10 and turbine section 12 each section having contrarotating rotors. The compressor section 10 has contrarotating concentrically mounted shafts 14 and 16. The outer shaft 16 is segmented where each segment 20 carries end mating flanges 22 that are fastened to each other by a suitable nut and bolt assembly 24. The blades 26 extending radially upwardly from the rotor/shaft assembly 14 are of conventional construction. The blades 28 extending radially downwardly from shaft 16 and attached to minidisks 30 have centrifugal and gas forces acting on them. The majority (or all) of the centrifugal loads are carried by the minidisks. The gas forces which provide the torque are carried by the shaft 16. The last segment portion 32 is suitably curved radially outward and defines with wall 34 an annular passage 36 communicating with scroll 38. Passage 36 extends from the rotating structure through a suitably vaned diffusion 39 attached to the stationary scroll 38.

From the foregoing it is apparent that the power plant working medium helium is admitted to the compressor through the inlet scroll 40 and inlet passage 42 where it is compressed and exited via scroll 38. The pressurized helium is then fed to the heat source, preferably a nuclear reactor or possibly a coal fired fluidized bed generally illustrated by reference numeral 37 and returned to scroll 38 into passage 44, and radial inflow inlet 46. The stationary portion of inlet 46 houses vanes 41 to swirl the air into the rotating turbine scroll.

The turbine section 12 is built up in similar fashion to the compressor section. The contrarotating shaft 48 is mechanically connected to shaft 16 via the exit support blades 50, diffuser wall member 52 and inlet support guide blades 54. Outer shaft 48 carries a plurality of turbine blades 56 extending radially downward in a construction similar to the compressor and shaft 14 carries turbine blades 58 extending radially upwardly in a construction similar to the compressor. The above-mentioned blades 50, 54 are sized to transmit the compressor and turbine torques through the outer rotor system and would be of wide chord construction to provide the necessary rigidity and strength to the rotor system.

As noted from the sole FIGURE, shaft 14 is supported by bearings 60 and 62 mounted at the extreme ends of the power plant and shafts 16 and 48 are supported by bearings 64 and 66 also mounted at the opposite extremities.

Hence, in operation the heated helium is admitted to turbine section 12 where it serves to drive the turbines which in turn drives the compressors in a well known manner. Power is extracted for use such as running an electrical generator via shaft 69 or in special cases through a shaft connected to rotor 16. The expended helium is cooled and returned to be compressed and recycled via exit scroll 70 and back to inlet scroll 40.

In this embodiment the outer casing 72 is fixed and suitably supported and the rotating machinery passes the gases from the compressor to the heat source and back to the turbine at the interface located in the center of the power plant. Hence, suitable seals are provided as shown at 74, 76, 78 and 80 and 82.

It should be understood that the invention is not limited to the particular embodiments shown and described herein, but that various changes and modifications may be made without departing from the spirit and scope of this novel concept as defined by the following claims.

I claim:

1. A self-contained power unit having an elongated enclosed casing rotatably supporting stages of axial flow compressors and turbines, said stages of compressors and turbines including alternate rows of compressor blades and alternate rows of turbine blades being in contrarotating relationship, said casing having an inlet ahead of the stages of the compressor and an outlet behind the stages of the turbine and passage means interconnecting said outlet and said inlet, helium being utilized as the working medium in said self-contained power unit, means external of said casing for adding heat to said helium, a split scroll between the said stages of said compressor and said stages of said turbine for directing the discharged helium from said compressor to a heat source and returning it to the turbine, an inner-shaft in said enclosed casing supporting alternate rows of said compressor blades and turbine blades of said stages of said compressor and said turbine for one direction of rotation, said casing supporting alternate rows of said compressor blades and turbine blades of said stages of compressor and turbine for an opposite direction of rotation, and said scroll means including means interconnecting said casing driven by said turbine blades with said casing driving said compressor blades.

2. A self-contained power unit as claimed in claim 1 including disk means attached to the outer tip of the said compressor blades extending from said casing.

3. A self-contained power unit as in claim 2 including additional disk means attached to the outer tip of said turbine blades extending from said casing.

4. A self-contained power unit as in claim 1 in which the casing and inner shaft are in concentric relation and are each supported by bearings at their outer extremities.

* * * * *